United States Patent [19]
Dunlap et al.

[11] 3,882,700
[45] May 13, 1975

[54] HELMENT LOCK FOR MOTORCYCLES

[76] Inventors: Weldon C. Dunlap, 5780 Gena Ln.; Thomas R. Philips, 215 Berkshire Ln., both of Beaumont, Tex. 77707

[22] Filed: Feb. 1, 1974

[21] Appl. No.: 438,798

[52] U.S. Cl. .................................................. 70/59
[51] Int. Cl. ........................................... E05b 69/00
[58] Field of Search .............. 70/14, 15, 18, 57, 58, 70/59; 211/4, 8, 7; 248/207

[56] References Cited
UNITED STATES PATENTS

| | | | |
|---|---|---|---|
| 322,880 | 7/1885 | Wirts .................................. | 24/72.5 |
| 3,410,122 | 11/1968 | Moses.................................... | 70/58 |
| 3,504,405 | 4/1970 | Elliott-Smith....................... | 70/14 X |
| 3,664,164 | 5/1972 | Zaidener.............................. | 70/202 |

FOREIGN PATENTS OR APPLICATIONS

877,545    9/1942    France .................................. 70/14

*Primary Examiner*—Robert L. Wolfe
*Attorney, Agent, or Firm*—Clarence A. O'Brien; Harvey B. Jacobson

[57] ABSTRACT

A generally U-shaped frame is provided including a pair of generally parallel legs interconnected at one pair of ends by means of a bight portion extending therebetween. The bight portion includes a pair of relatively telescopingly engaged end sections to whose remote ends the corresponding legs are rigidly secured and relative to which the corresponding legs are braced by means of angle bracing members. The adjacent telescopingly engaged ends of the end sections of the bight portion include coacting structure whereby the end sections may be moved relative to each other into maximum relatively extended positions and this coacting structure includes releasable locking structure whereby contraction of the relatively telescoped adjacent ends of the bight portion end sections is prevented until such time as the locking structure is released. The free ends of the legs of the frame include oppositely outwardly projecting abutment portions abuttingly and frictionally engageable with the inner surface portions of a safety helmet which normally cover the ears of the wearer of the helmet. By attaching the frame to a helmet after the closed end of the frame has been engaged with a structural member or the like of a motorcycle and actuating the locking structure removal of the helmet from the motorcycle is prevented.

9 Claims, 5 Drawing Figures

PATENTED MAY 13 1975    3,882,700

3,882,700

HELMENT LOCK FOR MOTORCYCLES

BACKGROUND OF THE INVENTION

In substantially all states the operator of a motorcycle must wear a safety helmet. However, it is not always convenient for the rider of the motorcycle to take his helmet with him when he reaches his destination. Accordingly, many motorcycle riders merely strap their helmets to their motorcycles after dismounting before they proceed to a further destination by other means such as walking. Although a helmet may be readily supported from an unattended motorcycle for convenience, it may also be readily removed from the motorcycle by unauthorized persons and therefore many safety helmets are stolen from unattended motorcycles. Of course, the replacement cost of a safety helmet is appreciable. Accordingly, there is a need to provide a means whereby a safety helmet may be locked to an unattended motorcycle.

It is accordingly the main object of this invention to provide a means of supporting a safety helmet from an unattended motorcycle in a manner such that unauthorized removal of the helmet from the motorcycle will be prevented.

Another object of this invention, in accordance with the immediately preceding object, is to provide an apparatus which may be readily locked, in conjunction with an attendant safety helmet, to substantially all types of motorcycles.

A final object of this invention to be specifically enumerated herein is to provide a motorcycle safety helmet lock which will conform to conventional forms of manufacture, be of simple construction and easy to use so as to provide a device that will be economically feasible, long lasting and relatively trouble-free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

DETAILED DESCRIPTION OF THE INVENTION

Figure 1:
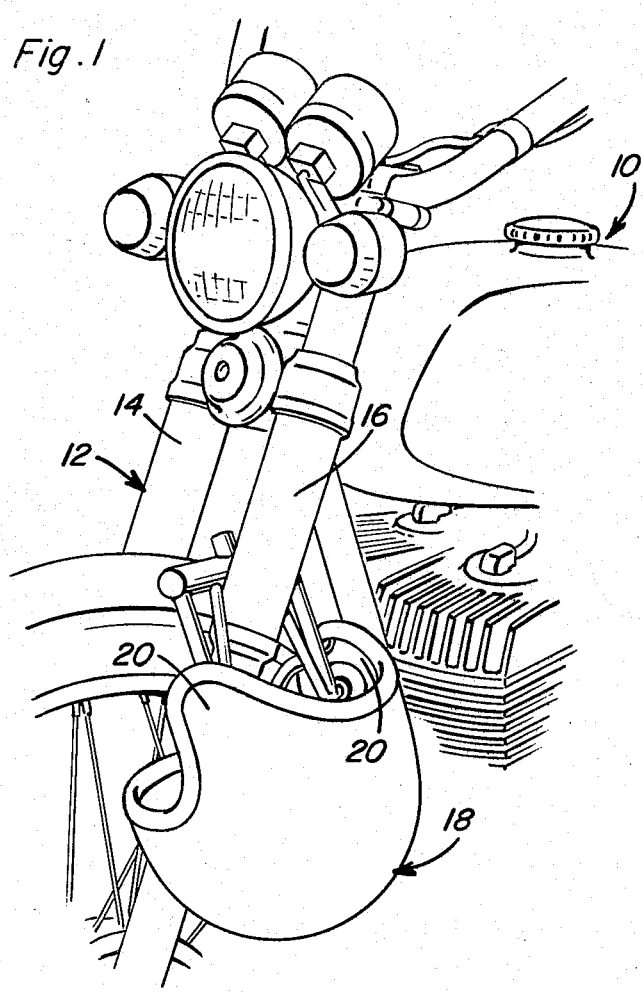
FIG. 1 is a fragmentary perspective view of a conventional form of motorcycle with the helmet support and lock of the instant invention operatively supported from the motorcycle and supporting an attendant helmet therefrom against removal from the motorcycle.
Figure 2:
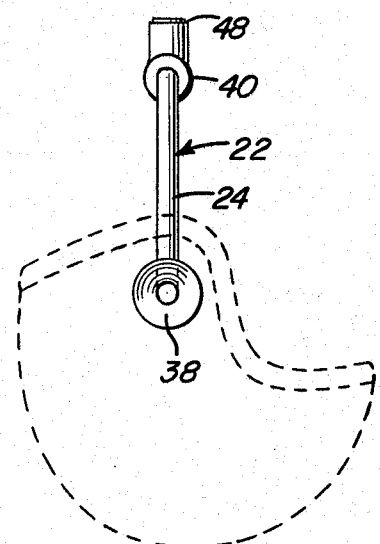
FIG. 2 is an end elevational view of the helmet lock.
Figure 3:
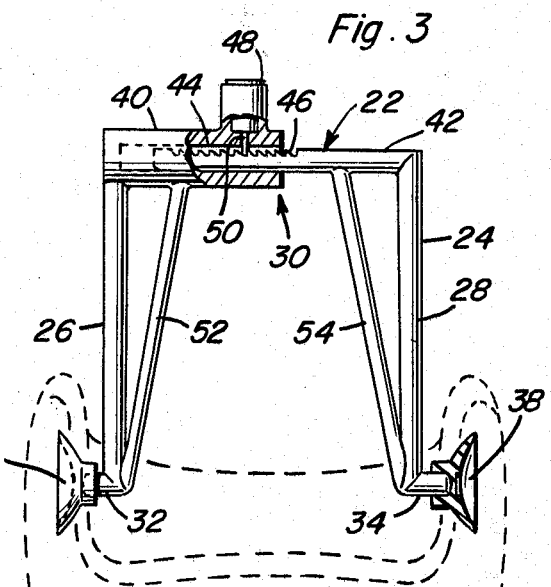
FIG. 3 is an enlarged front elevational view of the helmet lock with parts thereof being broken away and illustrated in vertical section.
Figure 4:
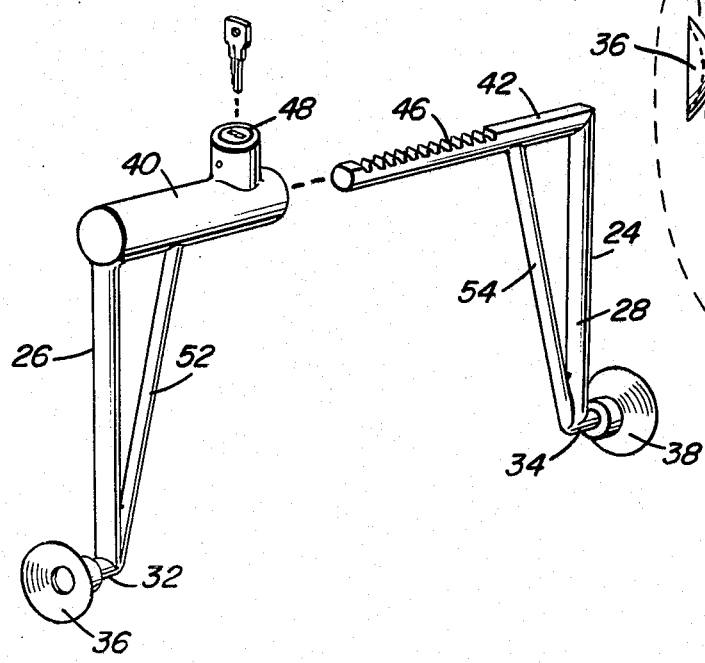
FIG. 4 is an exploded perspective view of the helmet lock.

The numeral 10 generally designates a conventional form of motorcycle including a front fork assembly 12. The fork assembly 12 includes a pair of generally parallel forwardly and downwardly inclined tubular support members 14 and 16.

A conventional form of safety helmet is referred to in general by the reference numeral 18 and includes opposite side portions 20 which are adapted to overlie the ears of the wearer of the helmet.

The helmet lock of the instant invention is referred to in general by the reference numeral 22 and includes a generally U-shaped frame 24. The frame 24 includes a pair of generally parallel legs or arms 26 and 28 interconnected at one pair of corresponding ends by means of a bright portion assembly referred to in general by the reference numeral 30. The free ends of the leg 26 and 28 include outturned terminal ends 32 having suction cup abutment members 36 and 38 mounted thereon.

The bright portion assembly 30 comprises a pair of end sections 40 and 42. The end section 40 projects inwardly from the corresponding end of the leg 26 and includes a blind bore 44 formed therein extending longitudinally thereof and opening through the inner end of the end section 40. The end section 42 is rigidly supported from the corresponding end of leg 28 and projects inwardly therefrom and is provided with longitudinally spaced ratchet teeth 46. The end of the end section 42 remote from the leg 28 is slidingly telescopingly engaged within the blind bore 44 and a lock assembly 48 is supported from the end section 40 and includes a spring-biased keeper 50 which may be locked in the extended position.

The free end of the legs 26 and 28 are braced relative to the midportions of the end sections 40 and 42 by means of inclined braces 52 and 54 extending between and rigidly secured thereto. Further, in FIG. 5 of the drawings it will be seen that a modified form of leg 26' and braced by means of an inclined brace member 52' corresponding to the brace member 52 may have a solid bulbous abutment member 36' corresponding to the abutment member 36 carried by the free end of its terminal end 32' corresponding to the terminal end 32. Of course, such a modified form of lock 22' is provided with a solid bulbous abutment member on its other leg.

In operation, when it is desired to lock the helmet 18 to the motorcycle 10, the lock 48 is released and the legs 26 and 28 are urged together so as to cause the end section 42 to be telescoped to its maximum within the end section 40. Then, the lock 22 is engaged with a structural member of the motorcycle 10 such as the tubular member 16 in the manner illustrated in FIG. 1 of the drawings and the free ends of the legs 26 are introduced into the helmet 18 in alignment with the portions 20 thereof. Then, the ends of the legs 26 and 28 adjacent the end sections 40 and 42 are pulled apart so as to securely seat the abutment members 36 against the inner surfaces of the portions 20 of the helmet 18, the ratchet teeth 46 serving to alternately cam the lockable keeper 50 toward its retracted position when the teeth 46 slide past the keeper 50. Of course, inasmuch as the keeper 50 is spring-biased toward an extended position and the profile of the ratchet teeth 46 is such to prevent contraction of the end section 42 relative to the end section 40 until such time as the lock is actuated to retract the keeper 50, the helmet 18 is securely anchored to the lock 20 and the latter is securely anchored to the tubular member 16.

When the operator of the motorcycle returns, it is merely necessary for him to insert his key into the lock 48 and to actuate the latter in order to retract the keeper 50 whereupon the legs 26 and 28 may be pushed together in order to retract the abutment members 36 and 38 from the inner surfaces of the portions 20 of the helmet 18, thus allowing the helmet 18 to be removed from the lock 22 and the latter to be removed from the tubular member 16.

Figure 5:
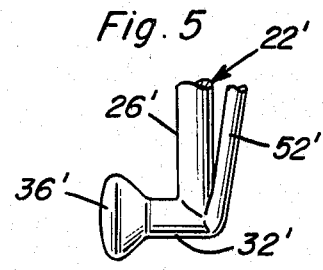
FIG. 5 is a fragmentary elevational view illustrating a modified form of helmet engaging abutment which may be used on the helmet lock.

Of course, the operation of the lock 22' illustrated in FIG. 5 is substantially identical. The only difference between the lock 22' and the lock 22 being that the abutment members 36' of the lock 22' are solid bulbous members as opposed to suction cup members such as the abutment members 36.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be restored to, falling within the scope of the invention.

What is claimed as new is as follows:

1. A helmet lock comprising a generally U-shaped body including generally parallel legs interconnected at one pair of corresponding ends by means of an elongated bight portion assembly extending and secured therebetween, the free end portions of the legs of said U-shaped body including oppositely outwardly facing and projecting abutment members adapted to engage the inner surface portions of the portions of a safety helmet covering the ears of the wearer of the helmet, said bight portion assembly including opposite end sections thereof from which the corresponding legs are supported, said end sections being guidingly supported from each other for adjustment of said legs toward and away from each other and including coacting lock means operable to releasably lock said end sections in adjusted relative positions against relative adjustment thereof to shift said legs toward each other.

2. The combination of claim 1 wherein said end sections include end portions thereof remote from the corresponding legs slidingly engaged with each other in end overlapped relation.

3. The combination of claim 2 wherein said end portions of said end sections are relatively telescopingly engaged with each other.

4. The combination of claim 1 including angle brace means extending between the free end portion of each leg and the corresponding end of said bight portion assembly at a point thereon spaced from the corresponding leg.

5. The combination of claim 1 wherein said abutment members comprise outwardly facing suction cup members.

6. The combination of claim 1 wherein said abutment members comprise enlarged bulbous solid abutment members.

7. The combination of claim 1 wherein said end section include end portions thereof remote from the corresponding legs slidingly engaged with each other in end overlapped relation, said end portions of said end sections include a first large diameter end portion having a central endwise outwardly opening blind bore formed therein and a second small diameter end portion snugly and slidably telescoped into said bore.

8. The combination of claim 1 wherein said coacting lock means includes deactuatable lock type ratchet means operative to allow outward relative adjustment of said legs away from each other and to prevent inward relative adjustment of said legs toward each other from relative outward adjusted positions thereof when said ratchet means is actuated and allow both outward and inward relative shifting of said legs when said ratchet means is deactuated.

9. In combination with a vehicle of the type including a bar portion about which a loop member may be loosely secured against removal therefrom and wherein the operator of the vehicle is prudent in wearing a head protective helmet of the type including slightly inwardly concave opposite side portions thereof for overlying the ears and adjacent head portions of the wearer, a helmet lock comprising a pair of transversely registered and spaced apart generally parallel arms, one pair of corresponding end portions of said arms including oppositely outwardly facing and projecting abutment members for engaging the inner surface portions of said helmet, support means extending between and interconnecting the other pair of corresponding end portions of said arms for guided shifting movement of said one pair of corresponding end portions of said arms toward and away from each other, said support means including deactuatable lock type ratchet means operative to allow outward relative adjustment of said one pair of corresponding end portions of said arms away from each other and to prevent inward relative adjustment of said one pair of corresponding end portions of said arms toward each other from relative outward shifted adjusted positions thereof when said ratchet means is actuated and allow both outward and inward relative shifting of said one pair of corresponding end portions of said arms when said ratchet means is deactuated, said vehicle including a bar portion about which a loop member may be loosely secured against removal thereof, said support means and the adjacent portions of said other pair of corresponding end portions of said arms being embracingly engageable about said bar portion.

* * * * *